US008821661B2

(12) United States Patent
Haga et al.

(10) Patent No.: US 8,821,661 B2
(45) Date of Patent: Sep. 2, 2014

(54) METHOD OF MANUFACTURING HONEYCOMB STRUCTURE AND DEGREASING APPARATUS FOR HONEYCOMB MOLDED BODY

(75) Inventors: Yuji Haga, Gifu (JP); Yusuke Fujii, Gifu (JP); Tadafumi Ohashi, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/278,221

(22) Filed: Oct. 21, 2011

(65) Prior Publication Data
US 2012/0111477 A1 May 10, 2012

(30) Foreign Application Priority Data

Nov. 10, 2010 (WO) .................. JP/2010/070049

(51) Int. Cl.
| | | |
|---|---|---|
| C03B 29/00 | (2006.01) | |
| B01J 35/10 | (2006.01) | |
| B01J 37/14 | (2006.01) | |
| B01J 35/00 | (2006.01) | |
| B01J 35/04 | (2006.01) | |
| B01J 37/08 | (2006.01) | |
| B01J 37/00 | (2006.01) | |
| B01J 29/04 | (2006.01) | |
| D02J 13/00 | (2006.01) | |
| F27B 9/02 | (2006.01) | |
| F27B 9/16 | (2006.01) | |
| F27B 5/16 | (2006.01) | |
| F27B 11/00 | (2006.01) | |
| F27B 5/00 | (2006.01) | |

(52) U.S. Cl.
CPC .............. *B01J 35/04* (2013.01); *B01J 35/1066* (2013.01); *B01J 37/14* (2013.01); *B01J 35/1071* (2013.01); *B01J 35/006* (2013.01); *B01J 35/002* (2013.01); *B01J 37/08* (2013.01); *B01J 37/0018* (2013.01); *B01J 35/1019* (2013.01); *B01J 29/04* (2013.01); *B01J 35/1014* (2013.01)
USPC ........ 156/89.12; 432/266; 432/258; 432/206; 432/130; 432/142; 432/200; 264/630; 264/605; 264/607

(58) Field of Classification Search
USPC .............. 156/89.22; 423/266, 258, 206, 247, 423/146, 128, 130, 132, 142, 143, 121, 126, 423/129, 200, 249; 264/630, 675, 605, 607, 264/608, 652
See application file for complete search history.

(56) References Cited

U.S. PATENT DOCUMENTS

| 5,116,586 | A | * | 5/1992 | Baacke et al. ............. 423/239.2 |
| 5,633,217 | A | * | 5/1997 | Lynn .............................. 502/439 |
| 6,214,437 | B1 | * | 4/2001 | Beall et al. .................... 428/116 |
| 7,250,385 | B1 | * | 7/2007 | Ohno et al. .................... 502/178 |

(Continued)

FOREIGN PATENT DOCUMENTS

| DE | 20 2006 006993 U1 | 7/2006 |
| DE | 10 2007 000895    | 5/2008 |

(Continued)

OTHER PUBLICATIONS

Extended European Search Report for corresponding EP Application No. 11182143.5-1270, Dec. 29, 2011.

*Primary Examiner* — Philip Tucker
*Assistant Examiner* — Alex Efta
(74) *Attorney, Agent, or Firm* — Mori & Ward, LLP (57) ABSTRACT

A method of manufacturing a honeycomb structure including a honeycomb unit includes forming a honeycomb molded body having a plurality of cells extending from a first end face to a second end face of the honeycomb molded body along a longitudinal direction of the honeycomb molded body and separated by a plurality of cell walls, placing the honeycomb molded body in a degreasing apparatus so that the first end face faces downward and the second end face faces upward, feeding introduced gas into the degreasing apparatus, degreasing the honeycomb molded body at a temperature of approximately 200° C. to approximately 400° C., and firing the degreased honeycomb molded body at a temperature of approximately 500° C. to approximately 900° C. to obtain the honeycomb unit.

27 Claims, 5 Drawing Sheets

(56) References Cited

U.S. PATENT DOCUMENTS

| | | | |
|---|---|---|---|
| 7,524,350 B2 * | 4/2009 | Kunieda | 55/523 |
| 2003/0053940 A1 * | 3/2003 | Harada et al. | 422/180 |
| 2007/0054229 A1 * | 3/2007 | Hanzawa et al. | 432/266 |
| 2007/0148402 A1 * | 6/2007 | Ohno et al. | 428/116 |
| 2008/0116621 A1 * | 5/2008 | Brennan et al. | 264/606 |
| 2008/0118682 A1 | 5/2008 | Ido et al. | |
| 2009/0200712 A1 | 8/2009 | Hayashi et al. | |
| 2009/0291824 A1 | 11/2009 | Ohno et al. | |
| 2009/0291834 A1 | 11/2009 | Ohno et al. | |

FOREIGN PATENT DOCUMENTS

| | | |
|---|---|---|
| EP | 1962038 | 8/2008 |
| JP | 03-093672 | 4/1991 |
| JP | 05213681 A * | 8/1993 |
| JP | 2003302166 A * | 10/2003 |
| JP | 2007-326765 | 12/2007 |
| JP | 2008-110896 | 5/2008 |
| JP | 2008-120652 | 5/2008 |
| JP | 2008120652 A * | 5/2008 |
| JP | 2009-112880 | 5/2009 |
| WO | WO 2005/047207 | 5/2005 |
| WO | WO 2008/059576 | 5/2008 |
| WO | WO 2009/141897 | 11/2009 |
| WO | WO 2009/141898 | 11/2009 |

* cited by examiner

METHOD OF MANUFACTURING HONEYCOMB STRUCTURE AND DEGREASING APPARATUS FOR HONEYCOMB MOLDED BODY

CROSS-REFERENCE TO RELATED APPLICATION

The present application claims priority under 35 U.S.C. §119 to International Application No. PCT/JP2010/070049, filed on Nov. 10, 2010, the entire contents of which are incorporated herein by reference.

BACKGROUND OF THE INVENTION

1. Field of the Invention

The present invention relates to a method of manufacturing a honeycomb structure and a degreasing apparatus for a honeycomb molded body.

2. Discussion of the Background

A large number of techniques have been developed in relation to conversion of automobile exhaust gas. With an increase in traffic, however, countermeasures taken against exhaust gas have hardly been satisfactory. Not only in Japan but also globally, is automobile emission control going to be further tightened.

In order to meet such control, catalyst supports capable of treating predetermined components contained in exhaust gas are used in exhaust gas conversion systems. Further, a honeycomb structure is known as a member for such catalyst supports.

This honeycomb structure has, for example, multiple cells (through holes) extending from one end face to another end face of the honeycomb structure along its longitudinal directions. These cells are separated from each other by cell walls supporting a catalyst or cell walls formed of a catalyst. Accordingly, in the case of causing exhaust gas to flow through such a honeycomb structure, substances contained in the exhaust gas, such as HC, CO, and/or NOx, are converted by the catalyst supported by the cell walls or the catalyst forming the cell walls, so that these toxic components in the exhaust gas may be treated.

In particular, in systems called SCR (Selective Catalytic Reduction) systems, it is possible to decompose NOx in exhaust gas into nitrogen and water using ammonia. For example, WO 09/141,897 A1 discloses a honeycomb structure having a honeycomb unit containing zeolite usable in SCR systems.

The entire contents of WO 09/141,897 A1 are incorporated herein by reference.

The honeycomb structure is formed by, for example, manufacturing a honeycomb molded body by subjecting raw material paste containing inorganic particles, an inorganic binder, an organic binder, a molding aid, water, etc., to extrusion molding and thereafter degreasing and firing this honeycomb molded body.

The degreasing is performed in order to decompose and remove the organic binder and the molding aid included in the honeycomb molded body before firing the honeycomb molded body.

SUMMARY OF THE INVENTION

According to one aspect of the present invention, a method of manufacturing a honeycomb structure including a honeycomb unit includes: forming a honeycomb molded body having a plurality of cells extending from a first end face to a second end face of the honeycomb molded body along a longitudinal direction of the honeycomb molded body and separated by a plurality of cell walls, the honeycomb molded body containing inorganic particles and at least one of a molding aid and an organic binder, the inorganic particles having a specific surface area of approximately 50 $m^2/g$ or more; placing the honeycomb molded body in a degreasing apparatus so that the first end face faces downward and the second end face faces upward; feeding introduced gas into the degreasing apparatus, the introduced gas flowing from the first end face to the second end face inside the honeycomb molded body through the cells, the introduced gas including oxygen and nitrogen, a ratio of oxygen to nitrogen being approximately 1.5:approximately 98.5 (vol %) to approximately 5.5:approximately 94.5 (vol %); degreasing the honeycomb molded body at a temperature of approximately 200° C. to approximately 400° C.; and firing the degreased honeycomb molded body at a temperature of approximately 500° C. to approximately 900° C. to obtain the honeycomb unit.

According to another aspect of the present invention, a degreasing apparatus for a honeycomb molded body includes a support, a feed part, a heating part and a guide part. The honeycomb molded body is placed on the support so that a first end face of the honeycomb molded body faces downward and a second end face of the honeycomb molded body faces upward. The honeycomb molded body contains inorganic particles and at least one of a molding aid and an organic binder. The inorganic particles have a specific surface area of approximately 50 $m^2/g$ or more. The honeycomb molded body has a plurality of cells extending from the first end face to the second end face along a longitudinal direction of the honeycomb molded body and separated by a plurality of cell walls. The feed part is configured to feed introduced gas into the degreasing apparatus. The introduced gas contains oxygen and nitrogen. A rate of oxygen to nitrogen is approximately 1.5:approximately 98.5 (vol %) to approximately 5.5: approximately 94.5 (vol %). The heating part is configured to heat the honeycomb molded body to a temperature of approximately 200° C. to approximately 400° C. The guide part is configured to guide the introduced gas so that the introduced gas flows from the first end face to the second end face inside the honeycomb molded body through the cells.

BRIEF DESCRIPTION OF THE DRAWINGS

Other objects, features and advantages of the present invention will become more apparent from the following detailed description when read in conjunction with the accompanying drawings, in which.

DESCRIPTION OF THE EMBODIMENTS

In the case of using particles having multiple micropores and a relatively large specific surface area (for example, a specific surface area of approximately 50 m²/g or more) as inorganic particles for the raw material paste, a problem is likely to be caused in that the carbon components of the organic binder and/or the molding aid may remain inside the micropores of the inorganic particles after the degreasing of the honeycomb molded body. This is believed to be because oxygen does not spread sufficiently inside the entire micropores of the inorganic particles during the degreasing of the honeycomb molded body, so that oxidation destruction reaction does not progress sufficiently for the organic binder and/or the molding aide.

Further, if the honeycomb molded body is fired with the carbon components of the organic binder and/or the molding aid remaining inside the micropores of the inorganic particles, the mutual condensation bonding of the inorganic particles through the inorganic binder is likely to become insufficient, so that the obtained honeycomb fired body is likely to be reduced in strength.

According to an embodiment of the present invention, a method of manufacturing a honeycomb structure is obtained that includes a degreasing process capable of more properly degreasing a honeycomb molded body containing inorganic particles having a relatively large specific surface area. Further, according to an embodiment of the present invention, a degreasing apparatus for such a honeycomb molded body is obtained.

The embodiments will now be described with reference to the accompanying drawings, wherein like reference numerals designate corresponding or identical elements throughout the various drawings.

A description is given below, based on the drawings, of features of an embodiment of the present invention.

Figure 1:
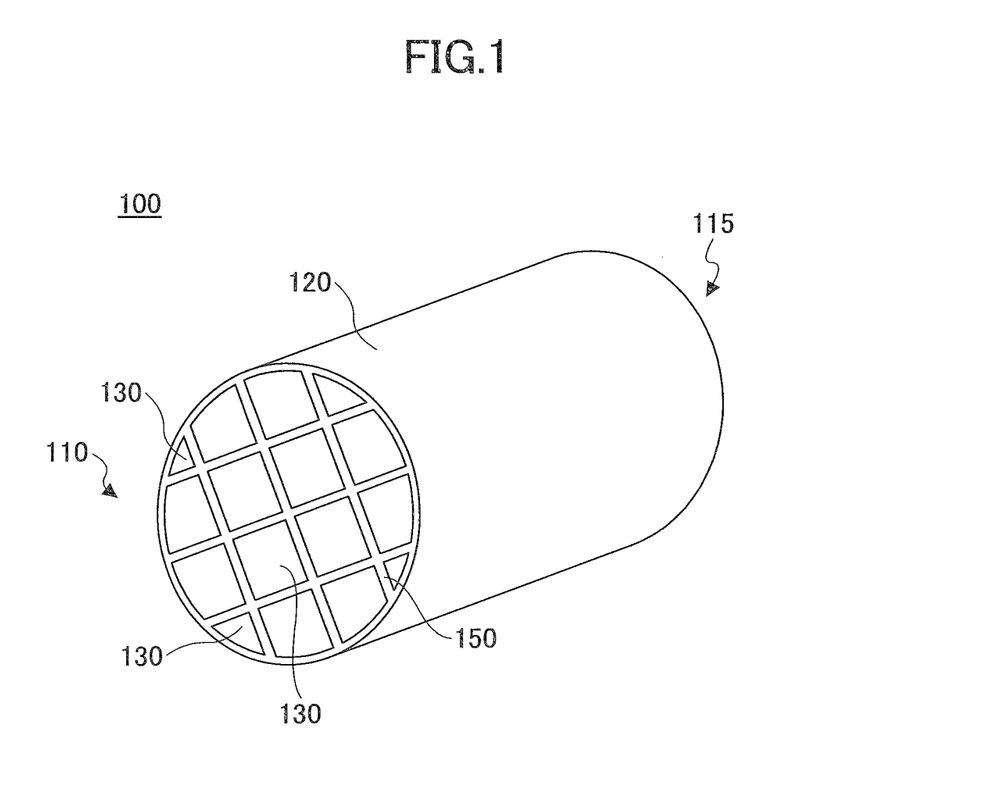
FIG. 1 is a schematic perspective view of a honeycomb structure according to an embodiment of the present invention.

FIG. 1 is a schematic structural illustration of a honeycomb structure. Further, FIG. 2 is a schematic illustration of a honeycomb unit, which is the basic unit of the honeycomb structure illustrated in FIG. 1.

As illustrated in FIG. 1, a honeycomb structure 100 includes two unsealed end faces 110 and 115. Further, the honeycomb structure 100 has an outer peripheral coat layer 120 provided at its outer peripheral surface except for the end faces 110 and 115.

Figure 2:
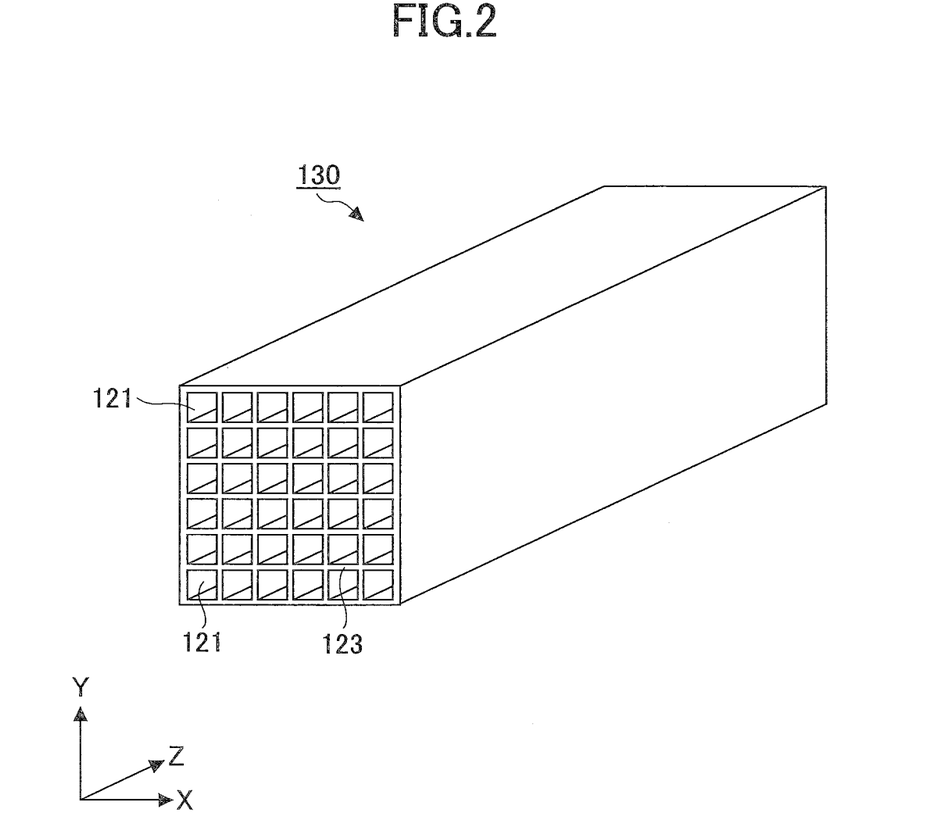
FIG. 2 is a schematic perspective view of a honeycomb unit that is a component of the honeycomb structure of FIG. 1 according to the embodiment of the present invention.

The honeycomb structure 100 is formed by, for example, joining multiple pillar ceramic honeycomb units 130 illustrated in FIG. 2 (16 units in a four-by-four matrix in the case of FIG. 1) by interposing an adhesive layer 150 and thereafter cutting the outer peripheral side except for the end faces 110 and 115 along a predetermined shape (a substantially cylindrical shape in the case of FIG. 1).

As illustrated in FIG. 2, the honeycomb unit 130 includes multiple cells (through holes) 121, extending from one end to another end of the honeycomb unit 130 along its longitudinal directions and open at the end faces, and cell walls 123 separating the cells 121. In the non-limiting case of FIG. 2, the cross sections of the cells 121 perpendicular to the longitudinal direction (Z direction) are substantially square.

In the case of using alumina, silica, titania, ceria, zirconia, mullite, zeolite, etc., as the inorganic particles included in a honeycomb unit, a honeycomb structure having such a honeycomb unit may be used as a catalyst support (catalyst) for converting CO, HC, and/or NOx, etc. In particular, a catalyst support (catalyst) that uses zeolite as inorganic particles may be used for a urea SCR system having a urea tank.

For example, in such a urea SCR system, when exhaust gas is caused to flow through the system, the urea contained in the urea tank reacts with water in the exhaust gas to generate ammonia (Eq. (1)):

$$CO(NH_2)_2 + H_2O \rightarrow 2NH_3 + CO_2. \quad (1)$$

When this ammonia, together with exhaust gas including NOx, flows into each cell 121 from one of the end faces 110 and 115 (for example, the end face 110) of the honeycomb structure 100, the reactions of the following Eqs. (2-1) and (2-2) are caused by the catalysis of the zeolite included in the cell walls 123:

$$4NH_3 + 4NO + O_2 \rightarrow 4N_2 + 6H_2O, \quad (2\text{-}1)$$

$$8NH_3 + 6NO_2 \rightarrow 7N_2 + 12H_2O. \quad (2\text{-}2)$$

Thereafter, the exhaust gas having NOx converted is discharged from another one of the end faces 110 and 115 (for example, the end face 115) of the honeycomb structure 100. Thus, by causing exhaust gas to flow inside the honeycomb structure 100, NOx in the exhaust gas can be treated.

A honeycomb unit of a honeycomb structure may have cell walls supporting a catalyst or have cell walls formed of a catalyst. In the following description, an explanation is given, taking a honeycomb structure including a honeycomb unit having cell walls formed of a catalyst as an example.

A honeycomb unit of a honeycomb structure is manufactured by, for example, manufacturing a honeycomb molded body by subjecting raw material paste containing inorganic particles, an inorganic binder, an organic binder, a molding aid, water, etc., to extrusion molding and thereafter degreasing and firing this honeycomb molded body.

The degreasing is performed in order to decompose and remove the organic binder and the molding aid included in the honeycomb molded body before firing the honeycomb molded body.

However, in the case of using particles having multiple micropores and a relatively large specific surface area (for example, approximately 50 m²/g or more) as the inorganic particles contained in the raw material paste, a problem is likely to be caused in that the carbon components of the organic binder and/or the molding aid may remain inside the micropores of the inorganic particles after the degreasing of the honeycomb molded body. This is believed to be because oxygen does not spread sufficiently inside the entire micropores of the inorganic particles during the degreasing of the honeycomb molded body, so that oxidation destruction reaction does not progress sufficiently for the organic binder and/or the molding aide.

Further, if the honeycomb molded body is fired with the carbon components of the organic binder and/or the molding aid remaining inside the micropores of the inorganic particles in the subsequent process, the mutual condensation bonding of the inorganic particles through the inorganic binder is likely to become insufficient. As a result, the obtained honeycomb unit (honeycomb fired body) is likely to be reduced in strength.

On the other hand, a method of manufacturing a honeycomb structure according to the embodiment of the present invention has a degreasing process with the following features:

(i) the honeycomb molded body is placed in, for example, a container with a first end face facing downward and a second end face facing upward (that is, with the honeycomb molded body being in a vertical position);

(ii) part of introduced gas for degreasing flows from bottom to top inside the honeycomb molded body, that is, from the first end face to the second end face of the honeycomb molded body, through the cells of the honeycomb molded body; and (iii) the introduced gas contains oxygen and nitrogen with an oxygen-to-nitrogen ratio of approximately 1.5:approximately 98.5 (vol %) to approximately 5.5:approximately 94.5 (vol %).

The amount of air or oxygen and the amount of nitrogen may be controlled to the above-described oxygen-to-nitrogen ratio by an introduced gas control part.

Here, when the introduced gas for degreasing is caused to pass through the cells of the honeycomb molded body, the introduced gas is believed to become turbulent in the cells of the honeycomb molded body. The turbulence of the introduced gas makes it easier for an oxygen component in the introduced gas to diffuse. The diffusion of the oxygen component in the introduced gas facilitates the entry of oxygen into the micropores of the inorganic particles of the cell walls to enable the oxidative destruction reaction of the organic binder and the molding aid present in the micropores of the inorganic particles.

Here, in the case of attempting to feed the introduced gas from top to bottom of the honeycomb molded body with the honeycomb molded body in a "vertical position," it is difficult to sufficiently feed the introduced gas into the micropores of the honeycomb molded body. This is because the introduced gas has a general tendency to become high in temperature and move upward by being warmed by heat during the process, and it is therefore difficult to ensure with such a method that the introduced gas is guided from the second end face to the first end face through the cells formed inside the honeycomb molded body.

On the other hand, in the case of degreasing the honeycomb molded body by feeding the honeycomb molded body with the introduced gas with the honeycomb molded body not in a "vertical position" but in a horizontal position, a problem is likely to be caused in that the introduced gas and the degreasing gas generated by the degreasing are less likely to be discharged from inside the honeycomb molded body. This is because the warmed introduced gas tends to move upward as described above. In this case, the composition of the introduced gas is altered by the degreasing gas, so that degreasing is less likely to be performed sufficiently at a point positioned on the downstream side of the introduced gas inside the honeycomb molded body.

On the other hand, according to the method of manufacturing a honeycomb structure of the embodiment of the present invention having the features (i) and (ii), it is possible to sufficiently feed introduced gas throughout the inside of the honeycomb molded body. Further, the stagnation of introduced gas and degreasing gas inside the honeycomb molded body as in the case of laying the honeycomb molded body horizontally is less likely to occur.

Further, according to the embodiment of the present invention, because of the feature (iii), the honeycomb molded body is constantly fed with introduced gas having a fixed oxygen concentration during degreasing.

Therefore, according to the method of manufacturing a honeycomb structure of the embodiment of the present invention, the features (i) through (iii) make it possible to spread oxygen sufficiently into the inside of the micropores of the inorganic particles contained in the honeycomb molded body. Further, this is likely to also produce the effect that the organic binder and the molding aid contained in the inorganic particles are sufficiently oxidized so that the carbon components are less likely to remain inside the micropores of the inorganic particles.

Thus, according to the method of manufacturing a honeycomb structure according to the embodiment of the present invention, even if a honeycomb molded body contains inorganic particles having multiple micropores and a relatively large specific surface area (for example, a specific surface area of approximately 50 $m^2/g$ or more), it is likely to be possible to degrease the honeycomb molded body without the carbon component of an organic binder and/or a molding aid remaining in the honeycomb molded body. Further, this is likely to make it possible to significantly control reduction in the strength of a honeycomb unit due to a residual component in a degreasing process in a honeycomb structure to be finally obtained.

[Configuration of the Honeycomb Structure 100]

Next, a brief description is given of a configuration of the honeycomb structure 100 illustrated in FIG. 1.

[Honeycomb Unit 130]

Here, a description is given in particular of the case where the honeycomb unit 130 included in the honeycomb structure 100 is formed of a zeolite-based material. It is clear to a person having ordinary skill in the art, however, that at least part of the subsequent description may also be applied to the case where the honeycomb unit 130 is formed of other material such as γ-alumina.

The honeycomb unit 130 contains inorganic particles (zeolite particles) and an inorganic binder. That is, the cell walls 123 of the honeycomb unit 130 are formed of the inorganic particles (zeolite particles) and the solids content of the inorganic binder. Further, the honeycomb unit 130 may also contain inorganic particles other than zeolite particles. The honeycomb unit 130 may further contain inorganic fibers.

Examples of zeolite contained in the honeycomb unit 130 include β-zeolite, zeolite Y, ferrierite, zeolite ZSM-5, mordenite, faujasite, zeolite A, zeolite L, phosphate-based zeolite, etc. The phosphate-based zeolite may be ALPO (aluminophosphate), SAPO (silico-aluminophosphate), etc. Further, zeolite may have Fe, Cu, Ni, Co, Zn, Mn, Ti, Ag, V, etc., introduced therein through ion exchange. Of these elements, Fe or Cu is preferable in particular.

The inorganic binder contained in the honeycomb unit 130 is desirably the solids content of at least one selected from the group consisting of alumina sol, silica sol, titania sol, water glass, sepiolite, attapulgite, and boehmite.

The inorganic particles contained in the honeycomb unit 130, other than zeolite particles, are desirably of alumina, silica, zirconia, titania, ceria, mullite, etc. The particles of these may be used alone or in combination.

Of the amount of the inorganic particles contained in the honeycomb unit 130, which consist of or include zeolite particles, the lower limit is desirably approximately 30 wt %, more desirably approximately 40 wt %, and still more desirably approximately 50 wt %, while the upper limit is desirably approximately 90 wt %, more desirably approximately 80 wt %, and still more desirably approximately 75 wt %. If the inorganic particles content is more than or equal to approximately 30 wt %, the amount of zeolite contributing to conversion of exhaust gas is less likely to be relatively reduced. On the other hand, if the inorganic particles content is less than or equal to approximately 90 wt %, the inorganic binder contributing to strength is less likely to be relatively reduced in amount, so that the strength of the honeycomb unit 130 is less likely to be reduced.

Further, in the case of adding inorganic fibers to the honeycomb unit 130, alumina, silica, silicon carbide, silica-alumina, glass, potassium titanate, aluminum borate or the like is desirable as the material of the inorganic fibers. These may be used alone or in combination. Of the above-described materials, alumina is desirable.

The average pore size of the honeycomb unit 130 is preferably in the range of approximately 0.01 μm to approximately 1.0 μm.

If the average pore size of the honeycomb unit 130 is more than or equal to approximately 0.01 μm, exhaust gas is likely to penetrate sufficiently into the cell walls 123 so that the exhaust gas conversion performance is less likely to be reduced. On the other hand, if the average pore size of the honeycomb unit 130 is less than or equal to approximately 1.0 μm, the contact points of the inorganic binder and the inorganic particles are less likely to be reduced, so that the strength of the honeycomb unit 130 is less likely to be reduced.

The cell density of the honeycomb unit 130 is preferably in the range of approximately 15.5 to approximately 186 cells/$cm^2$ (approximately 100 to approximately 1200 cpsi), more preferably in the range of approximately 46.5 to approximately 170 cells/$cm^2$ (approximately 300 to approximately 1100 cpsi), and still more preferably in the range of approximately 62 to approximately 155 cells/$cm^2$ (approximately 400 to approximately 1000 cpsi).

If the cell density of the honeycomb unit 130 is more than or equal to approximately 15.5 cells/$cm^2$, the area of the honeycomb unit 130 to come into contact with exhaust gas is less likely to be reduced, so that the exhaust gas conversion performance is less likely to be reduced. On the other hand, if the cell density of the honeycomb unit 130 is less than or equal to approximately 186 cells/$cm^2$, the pressure loss of the honeycomb structure 100 is less likely to increase.

The thickness of the cell walls 123 of the honeycomb unit 130 is not limited in particular, but has a desirable lower limit of approximately 0.1 mm in terms of strength and has a desirable upper limit of approximately 0.4 mm in terms of exhaust gas conversion performance.

[Adhesive Layer 150]

The adhesive layer 150 of the honeycomb structure 100 is formed using adhesive layer paste as a raw material.

The adhesive layer 150 is preferably approximately 0.3 mm to approximately 2.0 mm in thickness. This is because if the adhesive layer 150 is more than or equal to approximately 0.3 mm in thickness, the joining strength of the honeycomb units 130 is likely to be sufficient. Further, if the adhesive layer 150 is less than or equal to approximately 2.0 mm in thickness, the pressure loss of the honeycomb structure 100 is less likely to increase. The number of honeycomb units 130 to be joined is suitably determined in accordance with the size of the honeycomb structure 100.

The adhesive layer paste is not limited in particular, and may be a mixture of an inorganic binder and inorganic particles, a mixture of an inorganic binder and inorganic fibers, a mixture of an inorganic binder, inorganic particles, and inorganic fibers, etc.

The adhesive layer paste may further contain an organic binder. The organic binder is not limited in particular, and may be polyvinyl alcohol, methylcellulose, ethylcellulose, carboxymethylcellulose, etc. Two or more of them may be used together.

A pore-forming agent such as balloons, which are minute hollow balls whose component is oxide-based ceramic, spherical acryl particles, or graphite may be added to the raw material paste.

[Outer Peripheral Coat Layer 120]

The adhesive layer paste may be used for the outer peripheral coat layer 120 of the honeycomb structure 100. The outer peripheral coat layer 120 of the honeycomb structure 100 may be the same in material or different in material from the adhesive layer 150. The final thickness of the outer peripheral coat layer 120 is preferably approximately 0.1 mm to approximately 2.0 mm.

If the outer peripheral coat layer 120 is more than or equal to approximately 0.1 mm in thickness, the strength of the outer peripheral coat layer 120 is likely to be sufficient. Further, if the outer peripheral coat layer 120 is less than or equal to approximately 2.0 mm in thickness, the pressure loss of the honeycomb structure 100 is less likely to increase.

Next, an aggregate of honeycomb units 130 is cut along a predetermined shape (a substantially cylindrical shape in the case of FIG. 1), and outer peripheral coat layer paste is applied on the obtained outer peripheral surface to be dried and solidified at approximately 120° C. for approximately 60 minutes. Thereafter, the adhesive layer paste and the outer peripheral coat layer paste are degreased and solidified at approximately 600° C. for approximately 60 minutes, so that the honeycomb structure 100 is manufactured.

In the above description, an explanation is given of features of each member, taking the case as an example, where a honeycomb structure is formed by joining multiple honeycomb units 130 by interposing the adhesive layer 150 as illustrated in FIG. 1. However, it is clear to a person having ordinary skill in the art that the honeycomb structure may also be formed of a single honeycomb unit and that in this case as well, the configuration is the same except for the adhesive layer.

[Method of Manufacturing a Honeycomb Structure]

A description is given in detail below, with reference to the drawings, of a method of manufacturing a honeycomb structure according to the embodiment of the present invention.

Figure 3:
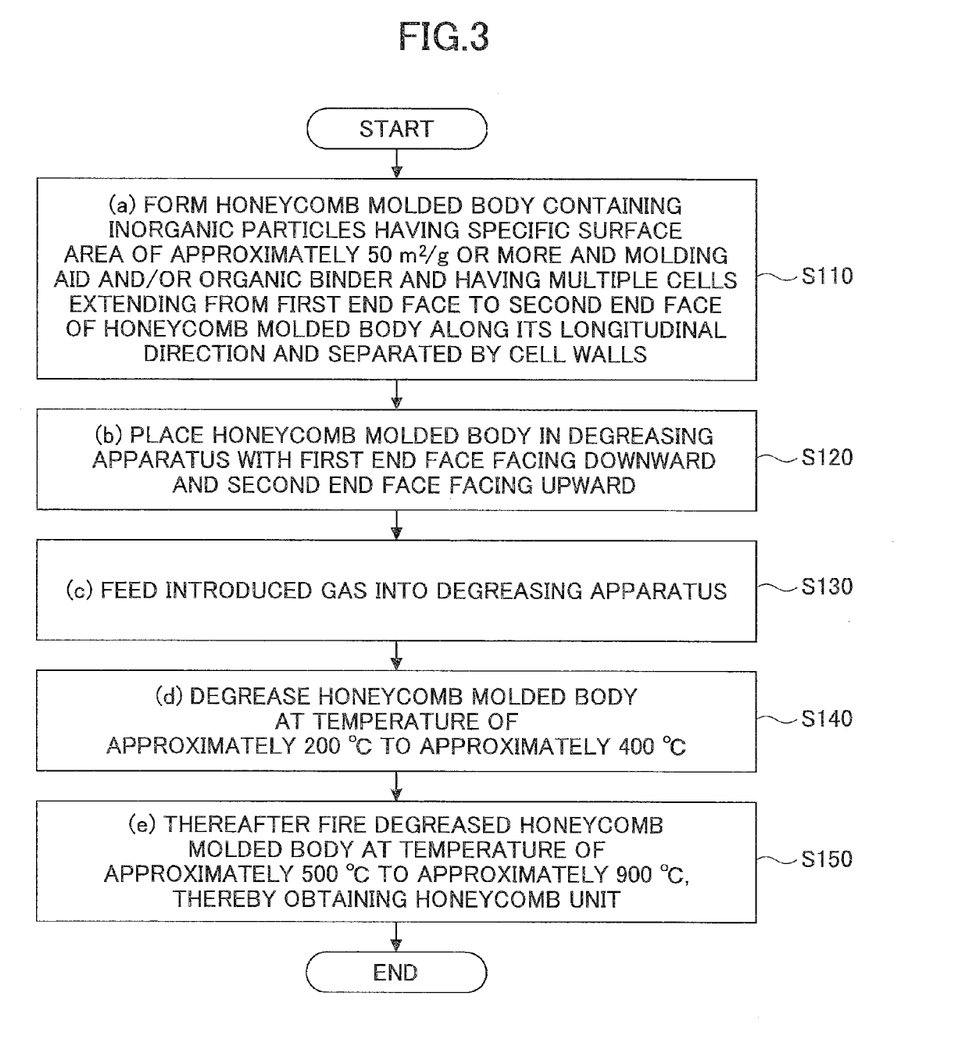
FIG. 3 is a flowchart of a method of manufacturing a honeycomb structure according to an embodiment of the present invention.

FIG. 3 illustrates a flowchart of a method of manufacturing a honeycomb structure according to the embodiment of the present invention. As illustrated in FIG. 3, the method of manufacturing a honeycomb structure according to the embodiment of the present invention includes:

(a) the process of forming a honeycomb molded body containing inorganic particles having a specific surface area of approximately 50 $m^2$/g or more and a molding aid and/or an organic binder and having multiple cells extending from a first end face to a second end face of the honeycomb molded body along its longitudinal direction and separated by multiple cell walls (step S110);

(b) the process of placing the honeycomb molded body in a degreasing apparatus with the first end face facing downward and the second end face facing upward (step S120);

(c) the process of feeding introduced gas into the degreasing apparatus (step S130);

(d) the process of degreasing the honeycomb molded body at a temperature of approximately 200° C. to approximately 400° C. (step S140); and (e) the process of thereafter firing the degreased honeycomb molded body at a temperature of approximately 500° C. to approximately 900° C. and thereby obtaining a honeycomb unit (step S150).

A description is given below of each of the processes.

[Step S110]

First, a honeycomb molded body is manufactured by the following method.

First, raw material paste containing inorganic particles and a molding aid and/or an organic binder is prepared. In addition to these, an inorganic binder, inorganic fibers, and/or a dispersion medium may be added to the raw material paste.

The inorganic particles may be of zeolite, alumina, silica, titania, ceria, zirconia, mullite, etc., of which zeolite is preferable.

The specific surface area of the inorganic particles is not limited in particular. However, the effects of the present invention are particularly excellent in the case of using inorganic particles having a specific surface area of approximately 50 m²/g or more.

A larger specific surface area of the inorganic particles is more preferable. The upper limit of the specific surface area of the inorganic particles is, for example, approximately 600 m²/g.

The molding aid is not limited in particular, and may be, for example, ethylene glycol, dextrin, a fatty acid, fatty acid soap, polyalcohol, etc.

The organic binder is not limited in particular, and may be one or more organic binders selected from, for example, methylcellulose, carboxymethylcellulose, hydroxyethylcellulose, polyethylene glycol, phenolic resin, epoxy resin, etc. The amount of the organic binder blended is preferably approximately 1 to approximately 10 parts by weight to the total of 100 parts by weight of the inorganic particles and the inorganic binder.

The inorganic fibers may be of alumina, silica, silicon carbide, silica-alumina, glass, potassium titanate, aluminum borate, etc. These may be used alone or in combination. Of the above-described materials, alumina is desirable.

The dispersion medium is not limited in particular, and may be, for example, water, an organic solvent (such as benzene), alcohol (such as methanol), etc. The molding aid is not limited in particular, and may be, for example, ethylene glycol, dextrin, a fatty acid, fatty acid soap, polyalcohol, etc.

The raw material paste is not limited in particular, and is preferably subjected to mixing and kneading. For example, the raw material paste may be mixed using a mixer, an attritor or the like, and may be well kneaded with a kneader or the like.

Next, a honeycomb molded body having a first end face and a second end face as illustrated in FIG. 2 is manufactured by performing extrusion molding using the raw material paste.

[Step S120]

Next, for degreasing, the obtained honeycomb molded body is placed inside a degreasing apparatus in a vertical position, that is, with the first end face of the honeycomb molded body facing downward and the second end face of the honeycomb molded body facing upward.

[Step S130]

Next, introduced gas is fed into the degreasing apparatus.

The introduced gas is fed so that at least part of the introduced gas flows from the first end face to the second end face inside the honeycomb molded body (that is, from bottom to top of the honeycomb molded body) through the cells inside the honeycomb molded body.

The introduced gas contains oxygen and nitrogen. The oxygen-to-nitrogen ratio is preferably approximately 1.5:approximately 98.5 (vol %) to approximately 5.5:approximately 94.5 (vol %), more preferably approximately 2.5:approximately 97.5 (vol %) to approximately 4.5:approximately 95.5 (vol %), and still more preferably approximately 3.5:approximately 96.5 (vol %).

The degreasing apparatus may include an introduced gas control part configured to so control the amount of air or oxygen and the amount of nitrogen as to achieve the above-described oxygen-to-nitrogen ratio, and the amount of air or oxygen and the amount of nitrogen may be controlled to the above-described oxygen-to-nitrogen ratio by this introduced gas control part.

If the oxygen concentration is less than or equal to approximately 5.5%, the degreasing reaction of the honeycomb molded body is less likely to be accelerated so that a sudden increase in the temperature of the honeycomb molded body is less likely to be caused, so that a problem is less likely to be caused in that zeolite is inactivated. Further, if the oxygen concentration is less than 1.5%, oxygen is prevented from being fed sufficiently into the micropores of the inorganic particles of the honeycomb molded body. This causes degreasing to be insufficient, so that the strength of a honeycomb unit is reduced.

Part of the introduced gas may be fed to the outer peripheral side of the honeycomb molded body. In this case, the introduced gas fed to the outer peripheral side of the honeycomb molded body may flow in the same direction as the introduced gas flowing from the first end face to the second end face inside the honeycomb molded body, that is, from bottom to top of the outer periphery of the honeycomb molded body.

[Step S140]

Next, the honeycomb molded body is maintained at a temperature of approximately 200° C. to approximately 400° C., and degreasing is performed.

[Step S150]

Finally, the degreased honeycomb molded body is fired at a temperature of approximately 500° C. to approximately 900° C. As a result, for example, such a honeycomb unit as illustrated in FIG. 2 is manufactured.

Thereafter, two or more of obtained honeycomb units are joined by interposing an adhesive layer. Further, the outer peripheral surface of this honeycomb unit joint body is cut into, for example, a substantially cylindrical shape using a diamond cutter or the like. As a result, a honeycomb structure of a desired shape is manufactured. An outer peripheral coat layer is formed at the outer peripheral surface of the honeycomb structure if needed.

It is clear to a person having ordinary skill in the art that the order of step S120 and step S130 in the above-described method is not limited in particular. That is, the introduced gas may be fed after the honeycomb molded body is placed in a vertical position, or the honeycomb molded body may be placed in a vertical position after the introduced gas is fed.

Further, in the above-described method, the process of placing the honeycomb molded body inside the degreasing apparatus (step S120) through the process of obtaining the honeycomb unit (step S150) may be performed in a batch process or be performed continuously.

Here, the honeycomb structure obtained by the method of manufacturing a honeycomb structure according to the embodiment of the present invention may have an alumina layer formed over the surfaces of the cell walls of the honeycomb units along their longitudinal directions.

In the case of the honeycomb molded body further containing an inorganic binder, the inorganic binder contains alumina or an alumina precursor, and an alumina layer is formed over the surfaces of the cell walls in the above-described process (e) (that is, in step S150).

This alumina layer originates from alumina particles contained in the inorganic binder and is believed to be formed by the following phenomenon.

If the honeycomb molded body contains an inorganic binder, the alumina particles contained in the inorganic binder, along with the organic binder, the molding aid, and/or the degreasing gas generated by their decomposition, are believed to move to the surfaces of the cell walls of the honeycomb molded body in the process of degreasing the honeycomb molded body. Of these, the organic binder and the molding aid are decomposed and removed at the surfaces of the cell walls of the honeycomb molded body by degreasing reaction. Further, the degreasing gas flows off from the surfaces of the cell walls of the honeycomb molded body as gas. Naturally, however, the alumina particles, which are not decomposed by degreasing, continue to remain on the surfaces of the cell walls of the honeycomb molded body. It is believed that as a result of uniform deposition of these remaining alumina particles on the surfaces of the cell walls of the honeycomb molded body, alumina is formed on the cell walls of the honeycomb molded body so that an alumina layer is finally formed on the cell walls of the honeycomb unit.

[Degreasing Apparatus for a Honeycomb Molded Body]

Figure 4:
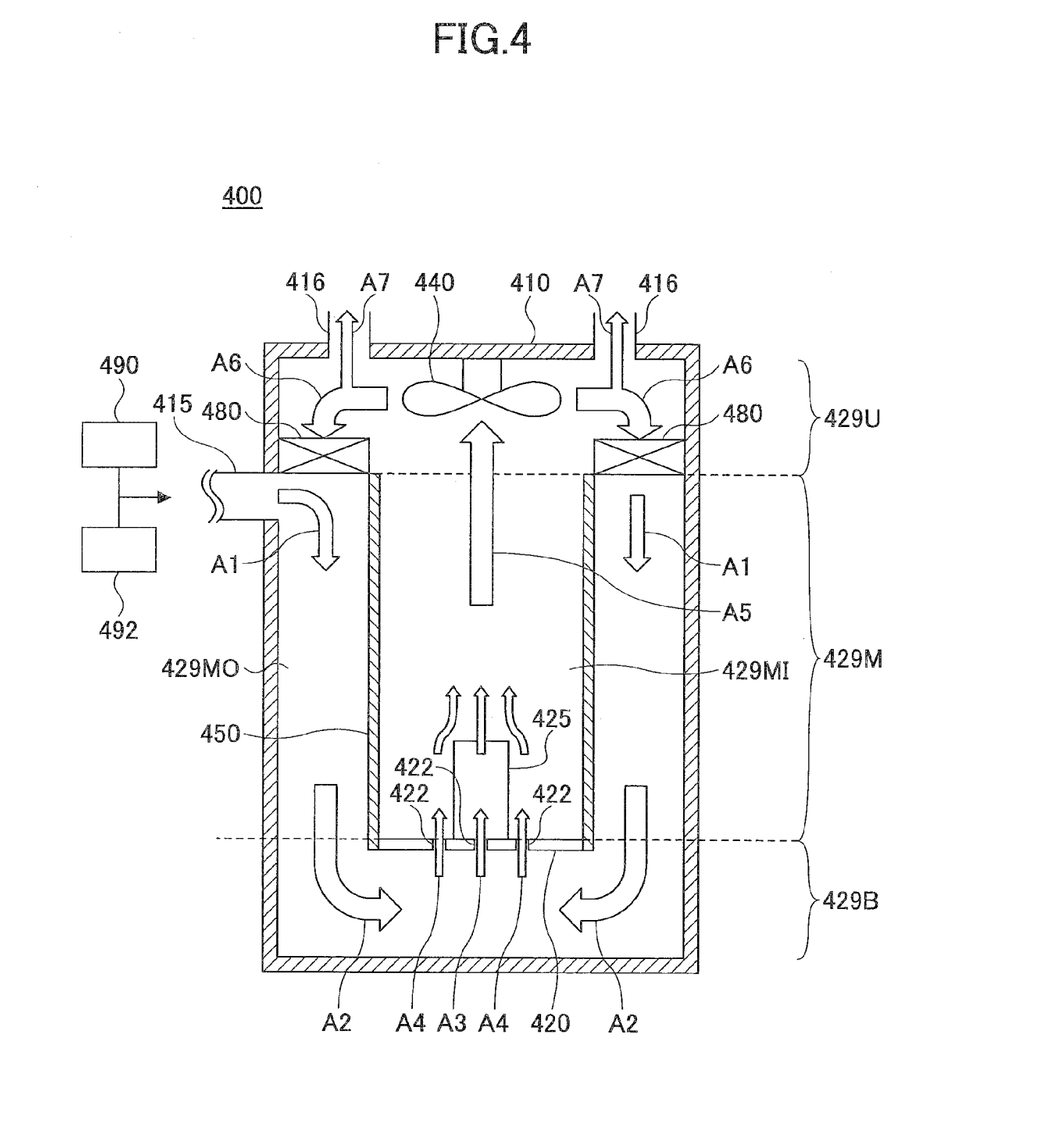
FIG. 4 is a schematic diagram illustrating a configuration of a degreasing apparatus for a honeycomb molded body according to an embodiment of the present invention.

Next, a description is given of a degreasing apparatus according to the embodiment of the present invention for performing the above-described processes of step S120 through step S140. FIG. 4 schematically illustrates a degreasing apparatus for a honeycomb molded body according to the embodiment of the present invention.

As illustrated in FIG. 4, a degreasing apparatus 400 includes a housing 410 for housing a honeycomb molded body 425. The inside of the housing 410 is roughly divided into an upper space 429U provided at the top, a bottom space 429B provided at the bottom, and a middle space 429M between the upper space 429U and the bottom space 429B. The middle space 429M is partitioned into an inner space 429MI where the honeycomb molded body 425 is placed and an outer space 429MO surrounding the inner space 429MI by a partition board 450 provided inside the middle space 429M. Further, the inner space 429MI of the middle space 429M and the bottom space 429B are partitioned by a support 420.

The housing 410 has a gas inlet 415 and a gas outlet 416.

The gas inlet 415 is provided to feed introduced gas into the housing 410. The gas inlet 415 is connected to an air source 490 and a nitrogen source 492 outside the housing 410. The air source 490 may be replaced with an oxygen source. In the case of FIG. 4, the gas inlet 415 is provided in an upper part of the middle space 429. Alternatively, the gas inlet 415 may be provided in the upper space 429U. In particular, it is preferable to provide the gas inlet 415 at a position higher than approximately half of the height of the housing 410.

If the gas inlet 415 is provided at a position higher than approximately half of the height of the housing 410, the mixing time for the introduced gas and discharged gas is less likely to be reduced. As a result, the gas components introduced into the cells of the honeycomb molded body 425 are less likely to become non-uniform depending on a position and time, so that the oxidative destruction of the organic binder and the molding aid is less likely to become insufficient.

On the other hand, the gas outlet 416 is provided to discharge the degreasing gas generated by the degreasing of the honeycomb molded body 425 and unreacted introduced gas to the outside of the housing 410. Usually, the gas outlet 416 is provided in the upper space 429U.

Further, in the case of FIG. 4, an oxidation catalyst 480 and a fan 440 are provided in the upper space 429U of the housing 410. As described below, however, the oxidation catalyst 480 is provided in reusing discharged gas, and is not always necessary in this degreasing apparatus 400.

In the case of FIG. 4, the oxidation catalyst 480 is so provided on the peripheral side of the housing 410 as to partition the upper space 429U and the outer space 429MO of the middle space 429M. The oxidation catalyst 480 has multiple fine through holes inside. Accordingly, gas passes between the upper space 429U and the outer space 429MO of the middle space 429M via the through holes inside the oxidation catalyst 480.

In the case of not using the oxidation catalyst 480, for example, a partition board that allows passage of gas between the upper space 429U and the outer space 429MO of the middle space 429M may be placed at the position of the oxidation catalyst 480. Further, in the case of not reusing discharged gas at all, a blocking board that blocks passage of gas between the upper space 429U and the outer space 429MO of the middle space 429M may be placed at the position of the oxidation catalyst 480.

As described above, the support 420 is so placed as to partition the inner space 429MI of the middle space 429M and the bottom space 429B in the housing 410. However, the support 420 has multiple through holes 422 to allow passage of gas between the bottom space 429B and the inner space 429MI of the middle space 429M of the housing 410.

Although not graphically illustrated in FIG. 4, the degreasing apparatus 400 further includes a heating part configured to heat the honeycomb molded body 425. Further, the degreasing apparatus 400 may include an introduced gas control part configured to control the amount of air fed from the air source 490 and the amount of nitrogen fed from the nitrogen source 492.

Next, a description is given of operations at the time of degreasing the honeycomb molded body 425 using the degreasing apparatus 400.

[Degreasing Preparation Step]

First, the honeycomb molded body 425 is placed in a vertical position on the support 420. At this point, the honeycomb molded body 425 is so placed on the support 420 as to allow passage of gas between the cells provided inside the honeycomb molded body 425 and the bottom space 429B via the through holes 422 of the support 420. In other words, the support 420 has the multiple through holes 422 so configured as to communicate with the cells provided inside the honeycomb molded body 425.

Figure 5:
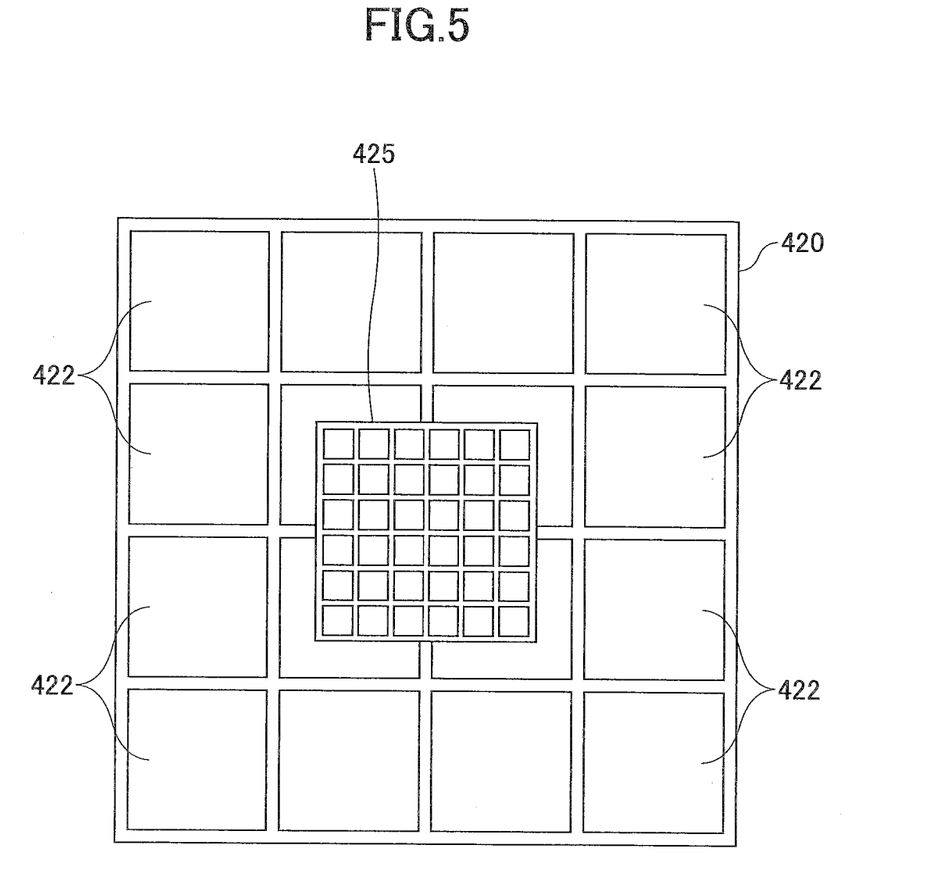
FIG. 5 is a schematic plan view of a support on which a honeycomb molded body is placed in the degreasing apparatus for a honeycomb molded body according to an embodiment of the present invention.

FIG. 5 is a schematic plan view of the support 420 on which the honeycomb molded body 426 is placed in the degreasing apparatus 400 for degreasing a honeycomb molded body according to the embodiment of the present invention. For reference, FIG. 5 simultaneously illustrates the outline of the honeycomb molded body 425 to be degreased.

As illustrated in FIG. 5, the through holes 422 of the support 420 are formed into a grid shape, whose openings are sufficiently larger in size than the cells of the honeycomb molded body 425. Accordingly, by placing the honeycomb molded body 425 on this support 420, gas is allowed to pass between the through holes 422 and the cells of the honeycomb molded body 425.

Next, when the air source 490 and the nitrogen source 492 are opened, gas composed of oxygen and nitrogen is introduced into the outer space 429MO of the middle space 429M of the housing 410 through the gas inlet 415 as indicated by arrows A1 in FIG. 4. At this point, the fan 440 operates to prevent the introduced gas from moving toward the upper space 429U through the oxidation catalyst 480. Further, the introduced gas is controlled to a predetermined oxygen-to-nitrogen ratio (for example, approximately 3.5:approximately 96.5 (vol %)) by controlling the amount of air from the air source 490 and the amount of nitrogen from the nitrogen source 492. This control of the amount of air and the amount of nitrogen may be performed by the above-described introduced gas control part.

The gas introduced through the gas inlet 415 is guided from the outer space 429MO of the middle space 429M of the housing 410 toward the bottom space 429B by the partition board 450 and the operation of the fan 440 as indicated by arrows A2 in FIG. 4.

The introduced gas reaching the bottom space 429B then enters the inner space 429MI of the middle space 429M via the through holes 422 provided in the support 420. At this point, part of the introduced gas moves upward through the cells inside the honeycomb molded body 425 as indicated by arrow A3 in FIG. 4. Further, part of the introduced gas moves upward through the outer periphery side of the honeycomb molded body 425 as indicated by arrows A4 in FIG. 4.

Thereafter, the parts of the introduced gas indicated by arrow A3 and arrows A4, respectively, are integrated again in an upper part of the inner space 429MI to move from the inner space 429MI to the upper space 429U as indicated by arrow A5 in FIG. 4.

At this stage, the gas outlet 416 provided in an upper part of the housing 410 is closed. Accordingly, the introduced gas reaching the upper space 429U is directly introduced again into the outer space 429MO of the middle space 429M via the oxidation catalyst 480 as indicated by arrows A6.

[Degreasing Step]

Next, the honeycomb molded body 425 is heated to a degreasing temperature with the introduced gas thus circulating through the housing 410. The degreasing temperature is preferably in the range of approximately 200° C. to approximately 400° C. At the same time, the gas outlet 416 is opened.

At this stage, the introduced gas flows inside the honeycomb molded body 425 as indicated by arrow A3 and on the outer periphery side of the honeycomb molded body 425 as indicated by arrows A4 to degrease the honeycomb molded body 425.

Here, the introduced gas flows from bottom to top in each of the cells of the honeycomb molded body 425. In particular, the introduced gas is warmed during the degreasing of the honeycomb molded body 425 to be likely to move upward. Therefore, the bottom-to-top movement of the introduced gas is further accelerated. Further, the composition (the ratio of oxygen to nitrogen) of the introduced gas before being fed to the honeycomb molded body 425 is set to a predetermined value.

Therefore, degreasing the honeycomb molded body 425 using this degreasing apparatus 400 makes it possible to sufficiently feed the introduced gas of a predetermined composition throughout the inside of the honeycomb molded body 425.

Accordingly, in the degreasing step, it is possible to cause the introduced gas to spread sufficiently into the micropores of the inorganic particles contained in the honeycomb molded body 425. As a result, the organic binder and the molding aid contained in the honeycomb molded body 425 are sufficiently oxidized, thus making it possible to prevent their components from remaining inside the micropores of the inorganic particles. As a result, the mutual condensation bonding of the inorganic particles is likely to be sufficiently accelerated, so that it is likely to be possible to obtain sufficient strength.

This degreasing causes degreasing gas to be generated from the honeycomb molded body 425. The generated degreasing gas, together with the introduced gas, moves from the inner space 429MI to the upper space 429U as indicated by arrow A5 in FIG. 4. (Hereinafter, these gases are referred to as "gas mixture.")

Here, in the case of the most simplified degreasing apparatus, the gas mixture that has moved into the upper space 429U is discharged outside the housing 410 through the gas outlet 416 as indicated by arrows A7 in FIG. 4 by opening the gas outlet 416.

However, according to such a method, it is necessary to continue feeding a large amount of introduced gas into the housing 410 from the air source 490 and the nitrogen source 492 during degreasing, thus causing an increase in processing cost.

Accordingly, the degreasing apparatus is preferably capable of recycling the gas mixture as the degreasing apparatus 400 illustrated in FIG. 4.

In the case of the degreasing apparatus 400, the gas mixture that has moved into the upper space 429U in the degreasing step is recycled in the following manner.

First, the gas outlet 416 is opened. As a result, part of the gas mixture guided into the upper space 429U is discharged outside the housing 410 via the gas outlet 416 as indicated by arrows A7 in FIG. 4. On the other hand, the remaining part of the gas mixture is guided into the oxidation catalyst 480 for recycling as indicated by arrows A6 in FIG. 4.

The gas mixture guided into the oxidation catalyst 480 is oxidized in the oxidation catalyst 480. As a result, gas components contained in the gas mixture, such as organic gas in particular, are oxidized and decomposed into vapor and carbon dioxide. Accordingly, in this case, it is likely to be possible to prevent the recycling of the gas mixture from increasing the amounts of organic gas components in the housing 410 to increase the risk of combustion of the gas mixture.

The ratio between oxygen and nitrogen in the gas mixture passed through the oxidation catalyst 480 to the middle space 429M for recycling may be different from the ratio between oxygen and nitrogen in the degreasing preparation step. Therefore, for example, the ratio between oxygen and nitrogen in the gas mixture may be constantly monitored with a gas sensor or the like in the region between the outer space 429MO of the middle space 429M and the bottom space 429B. If the ratio between oxygen and nitrogen is outside a predetermined range, the ratio between oxygen and nitrogen may be controlled to be within the predetermined range by controlling the amounts of air and nitrogen fed from the air source 490 and the nitrogen source 492, respectively. As a result, even in the case of recycling the gas mixture, it is possible to constantly maintain the ratio between oxygen and nitrogen in the gas fed to the honeycomb molded body 425 within a predetermined range.

The ratio of a gas mixture to be discharged from the upper space 429U via the gas outlet 416 to a gas mixture to be recycled is not limited in particular. For example, the amount of a gas mixture to be recycled may be approximately 90% of the whole gas mixture. (In this case, the amount of a gas mixture to be discharged is approximately 10%.)

According to the above-described embodiments, the specific surface area of inorganic particles may be determined by the multipoint BET (Brunauer-Emmett-Teller) method, and the average pore size of a honeycomb unit may be determined by mercury intrusion porosimetry.

EXAMPLES

A description is given below of examples of the present invention.

Example 1

A honeycomb unit as illustrated in FIG. 2 was actually manufactured by the method according to the embodiment of the present invention.

First, a honeycomb molded body was manufactured.

Raw material paste for a honeycomb unit molded body was made by mixing 3000 parts by weight of zeolite particles (having an average particles size of 2 μm and a specific surface area of 250 $m^2/g$), 650 parts by weight of alumina fibers (having an average fiber diameter of 6 μm and an average fiber length of 100 μm), 840 parts by weight of an inorganic binder (boehmite), 330 parts by weight of an organic binder (methylcellulose), 330 parts by weight of a lubricant, and 1800 parts by weight of ion-exchanged water as raw materials.

Next, a honeycomb unit molded body having a rectangular pillar shape as illustrated in FIG. 2 was obtained by performing extrusion molding with an extruder using this raw material paste. The size of the honeycomb molded body was 35 mm×35 mm×50 mm in length. Further, the cell walls of the honeycomb molded body were 0.25 mm in thickness, and the cell density of the honeycomb molded body was 71 cells/cm$^2$.

Next, the honeycomb molded body was degreased using the degreasing apparatus 400 as illustrated in FIG. 4.

The honeycomb molded body was placed in a vertical position on a support with a first end face facing downward and a second end face facing upward.

Next, introduced gas was fed into the degreasing apparatus 400. The composition of the introduced gas was an oxygen-to-nitrogen ratio of 3.5:96.5 (vol %). The flow rate of the introduced gas was 100 m$^3$ per hour. In this condition, the honeycomb molded body was heated to 400° C. with a temperature increase rate of 5° C. per minute, and was degreased.

Next, the honeycomb molded body was increased in temperature up to 700° C. with a temperature increase rate of 5° C. per minute, and was held at 700° C. for 2 hours. Thereafter, the honeycomb molded body was naturally cooled, thereby obtaining a honeycomb unit according to Example 1.

Example 2

A honeycomb unit according to Example 2 was manufactured in the same process as in Example 1. In Example 2, however, the composition of the introduced gas was an oxygen-to-nitrogen ratio of 5.0:95.0 (vol %). The other manufacturing conditions are the same as in Example 1.

Example 3

A honeycomb unit according to Example 3 was manufactured in the same process as in Example 1. In Example 3, however, the composition of the introduced gas was an oxygen-to-nitrogen ratio of 1.5:98.5 (vol %). The other manufacturing conditions are the same as in Example 1.

Comparative Example 1

A honeycomb unit according to Comparative Example 1 was manufactured in the same process as in Example 1. In Comparative Example 1, however, the conventional degreasing apparatus was used. In this degreasing apparatus, gas is introduced from above the degreasing apparatus. Further, no through holes are provided in a support for placing a honeycomb molded body. Accordingly, the introduced gas is prevented from flowing from the lower end face to the upper end face through the honeycomb molded body.

The other manufacturing conditions are the same as in Example 1.

[Evaluation]

A compression bending test was conducted using the honeycomb units manufactured in Examples 1 through 3 and Comparative Example 1, and the strength of each of the honeycomb units was evaluated by the compression bending test.

The compression bending test was a three-point bending test based on JIS R1601. The distance between supporting points was 30 mm. A load was applied from above to the center part of a side surface of the honeycomb unit with an indenter (probe), and the load at the time when the honeycomb unit broke was determined as bending strength.

As a result of the measurement, the bending strengths of Examples 1 through 3 are 4.9 MPa, 5.3 MPa, and 4.8 MPa, respectively. A good bending strength was obtained in each of Examples 1 through 3.

The bending strength of the honeycomb unit of Comparative Example 1 is 3.4 MPa, thus showing that the strength of the honeycomb unit is insufficient. It is believed that this is because the carbon components of the organic binder and/or the molding aid remained in the micropores of the inorganic particles to cause the mutual condensation bonding of the inorganic particles through the inorganic binder to be insufficient in the honeycomb unit manufactured in Comparative Example 1.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a honeycomb structure including a honeycomb unit, comprising:
    forming a honeycomb molded body having a plurality of cells extending from a first end face to a second end face of the honeycomb molded body along a longitudinal direction of the honeycomb molded body and separated by a plurality of cell walls, the honeycomb molded body containing inorganic particles, a molding aid, inorganic fibers and an organic binder, the inorganic particles including zeolite particles and having a specific surface area of approximately 50 m$^2$/g or more;
    placing the honeycomb molded body in a degreasing apparatus so that the first end face faces downward and the second end face faces upward;
    feeding introduced gas into the degreasing apparatus, the introduced gas flowing from the first end face to the second end face inside the honeycomb molded body through the cells, the introduced gas including oxygen and nitrogen, a ratio of oxygen to nitrogen being approximately 1.5: approximately 98.5 (vol %) to approximately 5.5: approximately 94.5 (vol %);
    degreasing the honeycomb molded body at a temperature of approximately 200° C. to approximately 400° C.;
    introducing at least a part of the introduced gas discharged from the second end face of the honeycomb molded body into through holes of an oxidation catalyst;
    mixing the at least a part of the introduced gas after being oxidized through the oxidation catalyst with the introduced gas fed into the decreasing apparatus at a position higher than approximately a half of a height of the decreasing apparatus;
    guiding the introduced gas mixed with the at least a part of the introduced gas to a position lower than the first end face of the honeycomb molded body; and
    firing the degreased honeycomb molded body at a temperature of approximately 500° C. to approximately 900° C. to obtain the honeycomb unit.

2. The method of manufacturing a honeycomb structure as claimed in claim 1, wherein the placing of the honeycomb molded body, the feeding of the introduced gas, the degreasing of the honeycomb molded body and the firing of the degreased honeycomb molded body are performed in one of a batch process and a continuous process.

3. The method of manufacturing a honeycomb structure as claimed in claim 1, wherein the zeolite particles contain at least one of β-zeolite, zeolite Y, ferrierite, zeolite ZSM-5, mordenite, faujasite, zeolite A, zeolite L, and phosphate-based zeolite.

4. The method of manufacturing a honeycomb structure as claimed in claim 3, wherein the phosphate-based zeolite is at least one of aluminophosphate (ALPO) and silico-aluminophosphate (SAPO).

5. The method of manufacturing a honeycomb structure as claimed in claim 1, wherein the zeolite particles are ion-exchanged with at least one of Fe, Cu, Ni, Co, Zn, Mn, Ti, Ag, and V.

6. The method of manufacturing a honeycomb structure as claimed in claim 1, wherein an amount of the inorganic particles containing the zeolite particles is in a range of approximately 30 wt % to approximately 90 wt % in the honeycomb unit.

7. The method of manufacturing a honeycomb structure as claimed in claim 1, wherein
a first part of the introduced gas is caused to flow from the first end face to the second end face inside the honeycomb molded body through the cells of the honeycomb molded body, and
a second part of the introduced gas is caused to flow in a direction parallel to a direction from the first end face to the second end face along an outer periphery of the honeycomb molded body.

8. The method of manufacturing a honeycomb structure as claimed in claim 1, wherein
the honeycomb molded body further contains an inorganic binder, the inorganic binder containing at least one of alumina and a precursor of the alumina, and
an alumina layer is formed on surfaces of the cell walls in the firing of the degreased honeycomb molded body.

9. The method of manufacturing a honeycomb structure as claimed in claim 1, wherein the honeycomb unit has an average pore size of approximately 0.01 μm to approximately 1.0 μm.

10. The method of manufacturing a honeycomb structure as claimed in claim 1, wherein the honeycomb structure is formed by joining a plurality of the honeycomb units by interposing an adhesive layer.

11. The method of manufacturing a honeycomb structure as claimed in claim 1, further comprising:
controlling an amount of air or oxygen and an amount of nitrogen so that the ratio of oxygen to nitrogen in the introduced gas is obtained.

12. The method of manufacturing a honeycomb structure as claimed in claim 1, wherein the inorganic particles contain at least one of zeolite, alumina, silica, zirconia, titania, ceria, and mullite.

13. The method of manufacturing a honeycomb structure as claimed in claim 1, wherein the honeycomb structure is formed of a single honeycomb unit.

14. The method of manufacturing a honeycomb structure as claimed in claim 1, wherein an upper limit of the specific surface area of the inorganic particles is approximately 600 $m^2/g$.

15. The method of manufacturing a honeycomb structure as claimed in claim 1, wherein the ratio of oxygen to nitrogen is approximately 2.5: approximately 97.5 (vol %) to approximately 4.5: approximately 95.5 (vol %).

16. The method of manufacturing a honeycomb structure as claimed in claim 1, further comprising:
forming an outer peripheral coat layer on the honeycomb unit obtained in the firing of the degreased honeycomb molded body so that the outer peripheral coat layer defines an outer peripheral surface of the honeycomb structure.

17. A degreasing apparatus for a honeycomb molded body, comprising:
a support to place the honeycomb molded body on the support so that a first end face of the honeycomb molded body faces downward and a second end face of the honeycomb molded body faces upward, the honeycomb molded body containing inorganic particles, a molding aid, inorganic fibers and an organic binder, the inorganic particles including zeolite particles and having a specific surface area of approximately 50 $m^2/g$ or more, the honeycomb molded body having a plurality of cells extending from the first end face to the second end face along a longitudinal direction of the honeycomb molded body and separated by a plurality of cell walls;
a feeder configured to feed introduced gas into the degreasing apparatus, the introduced gas containing oxygen and nitrogen, a rate of oxygen to nitrogen being approximately 1.5: approximately 98.5 (vol %) to approximately 5.5: approximately 94.5 (vol %);
a heater configured to heat the honeycomb molded body to a temperature of approximately 200° C. to approximately 400° C.;
a housing configured to house the honeycomb molded body and including an inlet which is provided at a position higher than approximately a half of a height of the housing;
a circulation path to reuse at least a part of the introduced gas discharged from the second end face of the honeycomb molded body as a part of the introduced gas;
an oxidation catalyst located in the circulation path and having through holes, the oxidation catalyst being configured to oxidize the at least part of the introduced gas by introducing the at least part of the introduced gas into the through holes; and
the circulation path including a guide configured to guide the introduced gas introduced through the inlet and the oxidized at least part of the introduced gas to a position lower than the first end face of the honeycomb molded body and configured to guide the introduced gas so that the introduced gas flows from the first end face to the second end face inside the honeycomb molded body through the cells of the honeycomb molded body.

18. The degreasing apparatus for a honeycomb molded body as claimed claim 17, wherein
a first part of the introduced gas flows from the first end face to the second end face inside the honeycomb molded body through the cells of the honeycomb body, and
a second part of the introduced gas flows in a direction parallel to a direction from the first end face to the second end face along an outer periphery of the honeycomb molded body.

19. The degreasing apparatus for a honeycomb molded body as claimed claim 17, wherein
the support has a plurality of through holes, and
the introduced gas is fed into the cells of the honeycomb molded body via the plurality of through holes.

20. The degreasing apparatus for a honeycomb molded body as claimed claim 17, wherein the inlet is connected to a nitrogen source and to one of an air source and an oxygen source, and the nitrogen source and the one of the air source and the oxygen source are outside the housing.

21. The degreasing apparatus for a honeycomb molded body as claimed claim 17, further comprising:

an introduced gas controller configured to control an amount of air or oxygen and an amount of nitrogen so that the ratio of oxygen to nitrogen in the introduced gas is obtained.

22. The degreasing apparatus for a honeycomb molded body as claimed claim 17, wherein an upper limit of the specific surface area of the inorganic particles is approximately 600 m$^2$/g.

23. The degreasing apparatus for a honeycomb molded body as claimed in claim 17, wherein the ratio of oxygen to nitrogen is approximately 2.5: approximately 97.5 (vol %) to approximately 4.5: approximately 95.5 (vol %).

24. The degreasing apparatus for a honeycomb molded body as claimed in claim 17, wherein
an inside of the housing is defined by a first space on a first end side of the housing in a height direction of the housing, a second space on a second end side of the housing in the height direction, and a third space between the first space and the second space, and
the third space is partitioned into a fourth space to place the honeycomb molded body and a fifth space surrounding the fourth space by a partitioning member provided inside the third space.

25. The degreasing apparatus for a honeycomb molded body as claimed in claim 24, wherein the fourth space and the second space are partitioned by the support.

26. The degreasing apparatus for a honeycomb molded body as claimed in claim 17, wherein the support has a plurality of through holes formed into a grid shape.

27. The method of manufacturing a honeycomb structure as claimed in claim 1, wherein the molding aid is at least one of ethylene glycol, dextrin, a fatty acid, fatty acid soap and polyalcohol.

* * * * *